United States Patent
Gornal M. et al.

(10) Patent No.: US 11,303,474 B1
(45) Date of Patent: Apr. 12, 2022

(54) SPLIT-HORIZON FILTERING FOR EVPN-VXLAN

(71) Applicant: Juniper Networks, Inc., Sunnyvale, CA (US)

(72) Inventors: Vinod Kumar Gornal M., Bangalore (IN); Harish Pandey, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 33 days.

(21) Appl. No.: 16/818,869

(22) Filed: Mar. 13, 2020

(51) Int. Cl.
*H04L 12/46* (2006.01)
*H04L 12/751* (2013.01)
*H04L 45/02* (2022.01)

(52) U.S. Cl.
CPC .......... *H04L 12/4645* (2013.01); *H04L 45/02* (2013.01); *H04L 2212/00* (2013.01)

(58) Field of Classification Search
CPC . H04L 12/4645; H04L 45/02; H04L 2212/00; H04L 45/50; H04L 12/4641
See application file for complete search history.

(56) References Cited

U.S. PATENT DOCUMENTS

| | | | | |
|---|---|---|---|---|
| 7,792,123 | B2* | 9/2010 | Hu | H04L 45/00 370/395.53 |
| 9,197,550 | B2* | 11/2015 | Zhang | H04L 12/4625 |
| 9,559,951 | B1* | 1/2017 | Sajassi | H04L 45/66 |
| 10,193,812 | B2* | 1/2019 | Nagarajan | H04L 47/15 |
| 2018/0331953 | A1* | 11/2018 | Hoang | H04L 45/66 |

OTHER PUBLICATIONS

Sajasse et al., "BGP MPLS-Based Ethernet VPN," Internet Engineering Task Force (IETF), RFC 7432, Feb. 2015, 57 pp.
Mahalingam et al., "Virtual eXtensible Local Area Network (VXLAN): A Framework for Overlaying Virtualized Layer 2 Networks over Layer 3 Networks," Independent Submission, RFC 7348, Aug. 2014, 23 pp.
Farinacci et al., "Generic Routing Encapsulation (GRE)," Network Working Group, RFC 2784, Mar. 2000, 10 pp.
Dommety, "Key and Sequence Number Extensions to GRE," Network Working Group, RFC 2890, Sep. 2000, 8 pp.
IEEE 802.1Q Standard for Local and metropolitan area networks, "Virtual Bridged Local Area Networks," IEEE Computer Society, May 19, 2006, 303 pp.

\* cited by examiner

*Primary Examiner* — Chandrahas B Patel
(74) *Attorney, Agent, or Firm* — Shumaker & Sieffert, P.A.

(57) ABSTRACT

Techniques for split-horizon filtering for EVPN-VXLANs are described. For example, an egress provider edge (PE) device is configured to apply split-horizon filtering to a BUM packet received from an intermediate network if the BUM packet includes a split-horizon identifier advertised by the egress PE device. As one example, the PE device encapsulates the split-horizon identifier within a tagging packet frame, such as a tagging packet frame in accordance with the 802.1Q tag format comprising a Tag Protocol Identifier (TPID). An ingress PE device receives the split-horizon identifier advertised by the egress PE device and is configured to encapsulate the split-horizon identifier within a BUM packet received from the Ethernet segment, and send the encapsulated packet into the intermediate network towards the egress PE device. In this way, when egress PE device receives the encapsulated packet including the split-horizon identifier, the egress PE device performs split-horizon filtering on the packet.

19 Claims, 5 Drawing Sheets

SPLIT-HORIZON FILTERING FOR EVPN-VXLAN

TECHNICAL FIELD

The disclosure relates to computer networks, and, more particularly, to network devices providing packet forwarding.

BACKGROUND

A computer network is a collection of interconnected network devices that can exchange data and share resources. Example network devices include switches or other layer two (L2) devices that operate within the second layer of the Open Systems Interconnection (OSI) reference model, i.e., the data link layer, and routers or other layer three (L3) devices that operate within the third layer of the OSI reference model, i.e., the network layer. Network devices within computer networks often include a control unit that provides a control plane functionality for the network device and forwarding components for routing or switching data units.

An Ethernet Virtual Private Network ("EVPN") may be used to extend two or more remote L2 customer networks through an intermediate L3 network (usually referred to as a "provider network"), in a transparent manner, i.e., as if the intermediate L3 network does not exist. In particular, the EVPN transports L2 communications, such as Ethernet packets or "frames," between customer networks via the intermediate L3 network. In a typical configuration, provider edge ("PE") network devices (e.g., routers and/or switches) coupled to the customer edge ("CE") network devices of the customer networks define label switched paths (LSPs) within the provider network to carry encapsulated L2 communications as if these customer networks were directly attached to the same local area network (LAN). In some configurations, the PE devices may also be connected by an IP infrastructure in which case IP/GRE tunneling or other IP tunneling can be used between the network devices.

In an EVPN configuration referred to as active-active mode, an Ethernet segment includes multiple PE devices that provide multi-homed connectivity for one or more local customer network devices, e.g., CE devices. Moreover, the multiple PE devices provide transport services through the intermediate network to a remote PE device, and each of the multiple PE devices in the Ethernet segment may forward Ethernet frames in the segment for the customer network device. In active-active mode, one of the multiple PE devices for the Ethernet segment is dynamically elected as a designated forwarder ("DF") for so called Broadcast, unidentified Unicast, or Multicast ("BUM") traffic that is to be flooded within the EVPN based on EVPN/Multiprotocol BGP (MP-BGP) routes received from the other PE devices. The PE device elected as the DF assumes the primary role for forwarding BUM traffic to the CE device.

SUMMARY

In general, techniques are described for providing split-horizon filtering for EVPN-VXLAN. For example, an egress provider edge (PE) device is configured to apply split-horizon filtering to a BUM packet received from an intermediate network if the BUM packet includes a split-horizon identifier advertised by the egress PE device. For example, the PE device is configured to determine if the BUM packet includes the split-horizon identifier, and in response to determining that the packet includes the split-horizon identifier, the PE device does not forward the BUM packet back to the Ethernet segment identified by the split-horizon identifier. The egress PE device sends the split-horizon identifier to other PE devices connected to the Ethernet segment. As one example, the PE device encapsulates the split-horizon identifier within or appended to a tagging packet frame, such as a tagging packet frame in accordance with the 802.1Q tag format. As one example, an 802.1Q packet may comprise a Tag Protocol Identifier (TPID) that identifies the packet as an IEEE 802.1 Q-tagged frame.

An ingress PE device receives the split-horizon identifier advertised by the egress PE device and is configured to encapsulate the split-horizon identifier within a BUM packet received from the Ethernet segment, and send the encapsulated packet into the intermediate network towards the egress PE device. In this way, when egress PE device receives the encapsulated packet including the split-horizon identifier, the egress PE device performs split-horizon filtering on the packet to prevent the packet from being forwarded back to the Ethernet segment.

The techniques described herein may provide one or more technical advantages that realize a practical application. For example, by encapsulating a split-horizon identifier within the tagging packet frame, the PE device elected as the designated forwarder may perform split-horizon filtering to BUM traffic received over the intermediate network without needing to search for a match in a list of non-DF PE devices that belong to the same Ethernet segment by using the source IP address of the BUM traffic as a key to search for a match in the list of non-DF PE devices, which is a less efficient method to determine whether to implement split-horizon filtering. Moreover, implementing the techniques described in this disclosure avoid transient BUM loops that may occur during link recovery of a link between the CE device and the non-DF PE device.

In one example, a method includes sending, by a first provider edge (PE) device and to a second PE device, a first Ethernet Auto-Discovery (AD) route advertising reachability to an Ethernet segment coupled to the first PE device and the second PE device, wherein the first PE device and the second PE device belong to a set of routers implementing an Ethernet Virtual Private Network (EVPN). The method also includes receiving, by a first provider edge (PE) device and from the second PE device, a second Ethernet AD route advertising reachability to the Ethernet segment. The method further includes configuring, by the first PE device, the first PE device, when operating as a non-designated forwarder of the EVPN, to encapsulate a split-horizon identifier that identifies the Ethernet segment within a packet received from a customer network. Moreover, the method includes configuring, by the first PE device, the first PE device, when operating as a designated forwarder of the EVPN, to apply split-horizon filtering to prevent the packet including the split-horizon identifier from being forwarded to the Ethernet segment.

In another example, a first provider edge (PE) device comprises one or more processors operably coupled to a memory, wherein the one or more processors are configured to send, to a second PE device, a first Ethernet Auto-Discovery (AD) route advertising reachability to an Ethernet segment coupled to the first PE device and the second PE device, wherein the first PE device and the second PE device belong to a set of routers implementing an Ethernet Virtual Private Network (EVPN). The one or more processors are also configured to receive, from the second PE device, a second Ethernet AD route advertising reachability to the Ethernet segment. The one or more processors are further configured to configure the first PE device, when operating as a non-designated forwarder of the EVPN, to encapsulate a split-horizon identifier that identifies the Ethernet segment within a packet received from a customer network. Moreover, the one or more processors are further configured to configure the first PE device, when operating as a designated forwarder of the EVPN, to apply split-horizon filtering to prevent the packet including the split-horizon identifier from being forwarded to the Ethernet segment.

In yet another example, a system comprises a first provider edge (PE) device configured to operate as a non-designated forwarder for an Ethernet segment, wherein the first PE device belongs to a set of routers implementing an Ethernet Virtual Private Network (EVPN); and a second PE device configured to operate as a designated forwarder for the Ethernet segment, wherein the second PE device belongs to the set of routers implementing the EVPN; wherein the first PE device comprises one or more first processors operably coupled to a first memory, wherein the one or more first processors are configured to: send, to the second PE device, a first Ethernet Auto-Discovery (AD) route advertising reachability to the Ethernet segment; receive, from the second PE device, a second Ethernet AD route advertising reachability to the Ethernet segment; configure the first PE device to encapsulate a split-horizon identifier that identifies the Ethernet segment within a packet received from a customer network; wherein the second PE device comprises one or more second processors operably coupled to a second memory, wherein the one or more second processors are configured to: send, to the first PE device, the second Ethernet AD route advertising reachability to the Ethernet segment; receive, from the first PE device, the second Ethernet AD route advertising reachability to the Ethernet segment; and configuring the second PE device to apply split-horizon filtering to prevent the packet including the split-horizon identifier from being forwarded to the Ethernet segment.

The details of one or more examples of the techniques are set forth in the accompanying drawings and the description below. Other features, objects, and advantages of the techniques will be apparent from the description and drawings, and from the claims.

DETAILED DESCRIPTION

Figure 1:
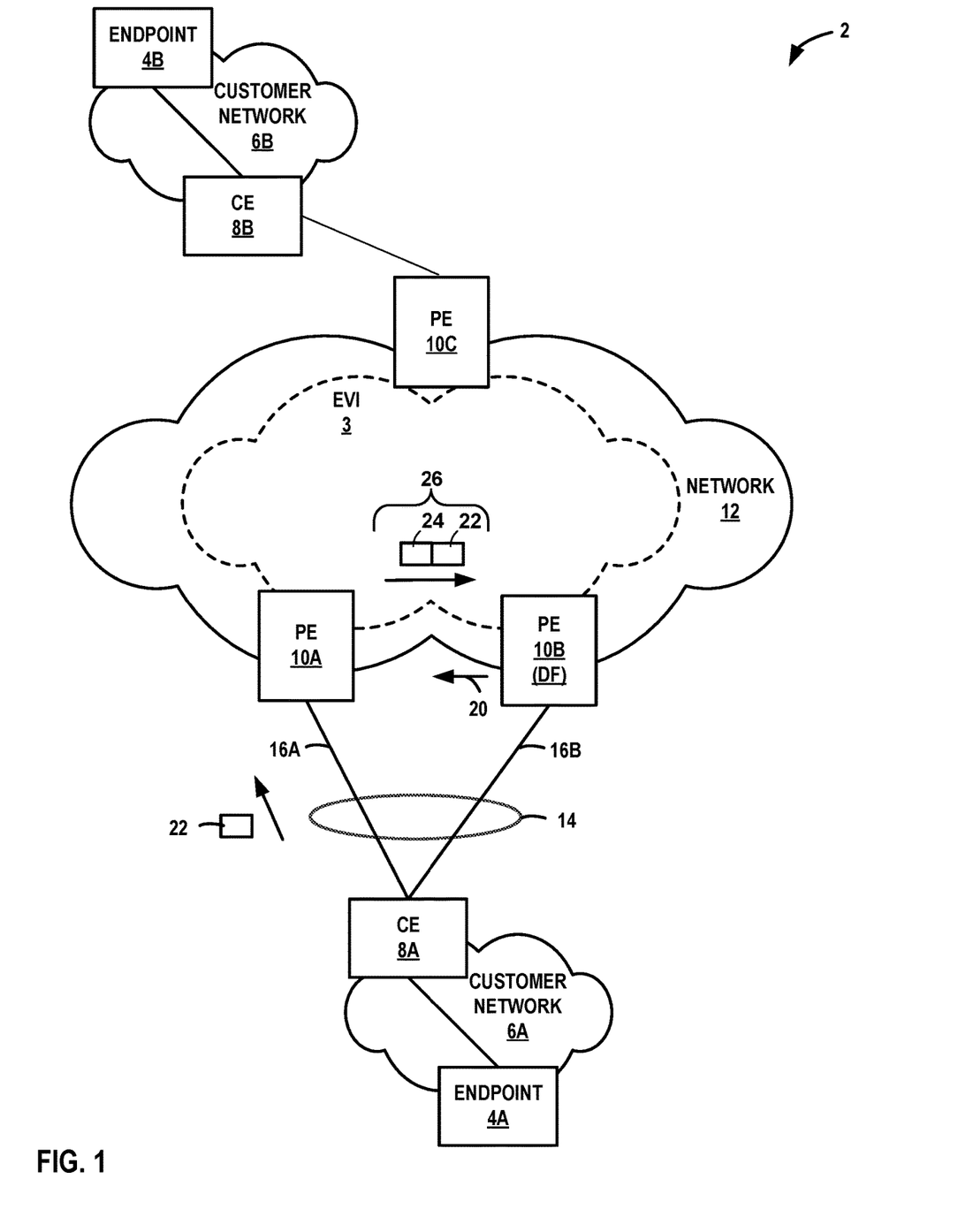
FIG. 1 is a block diagram illustrating an example network system configured to implement one or more techniques described herein.

FIG. 1 is a block diagram illustrating a network system 2 configured in accordance with one or more aspects of the techniques described in this disclosure. As shown in FIG. 1, network system 2 includes provider edge (PE) devices 10A-10C (collectively, "PE devices 10") that provide customer endpoints 4A-4B (collectively, "endpoints 4") associated with customer networks 6A-6B (collectively, "customer networks 6") with access to a layer 3 intermediate network 12 (alternatively referred to herein as "core network 12" or "service provider network 12") via customer edge (CE) devices 8A-8B (collectively, "CE devices 8"). The configuration of network system 2 illustrated in FIG. 1 is merely an example. For example, network system 2 may comprise any number of customer networks 6 interconnected by PE devices 10. Nonetheless, for ease of description, only customer networks 6A-6B and PE devices 10A-10C are illustrated in FIG. 1.

Intermediate network 12 may represent a public network that is owned and operated by a service provider to interconnect a plurality of edge networks, such as customer networks 6. Intermediate network 12 is a layer 3 ("L3") network in the sense that it natively supports L3 operations as described in the OSI model. Common L3 operations include those performed in accordance with L3 protocols, such as the Internet protocol ("IP"). L3 is also known as a "network layer" in the OSI model and the "IP layer" in the TCP/IP model, and the term L3 may be used interchangeably with "network layer" and "IP" throughout this disclosure. As a result, intermediate network 12 may be referred to herein as a Service Provider ("SP") network or, alternatively, as a "core network" considering that intermediate network 12 acts as a core to interconnect edge networks, such as customer networks 6. Although not illustrated, intermediate network 12 may be coupled to one or more networks administered by other providers, and may thus form part of a large-scale public network infrastructure, e.g., the Internet.

Intermediate network 12 may provide a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by a service provider intermediate network 12 includes layer 2 ("L2") Ethernet Virtual Private Network ("EVPN") service. Intermediate network 12 represents an L2/L3 switch fabric for one or more customer networks that may implement an L2 EVPN service. An EVPN is a service that provides a form of L2 connectivity across an intermediate L3 network, such as network 12, to interconnect two or more L2 customer networks, such as L2 customer networks 6, that may be located in different geographical areas (in the case of service provider network implementation) and/or in different racks (in the case of a data center implementation). Often, EVPN is transparent to the customer networks in that these customer networks are not aware of the intervening intermediate network and instead act and operate as if these customer networks were directly connected and form a single L2 network. In a way, EVPN enables a form of a transparent local area network ("LAN") connection between two customer sites that each operates an L2 network and, for this reason, EVPN may also be referred to as a "transparent LAN service."

Customer networks 6 may be networks for geographically or logically separated sites of an enterprise or may represent networks for different customers of the intermediate network 12 (or tenants of a data center network). Each of endpoints 4 may represent one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Each of endpoints 4 may be a host, server, virtual machine, container, or other source or destination for L2 traffic.

In the example of FIG. 1, PE devices 10 provide customer devices 4 associated with customer networks 6 with access to intermediate network 12 via CE devices 8. PE devices 10 and CE devices 8 may each represent a router, switch, or other suitable network device that participates in an L2 network ("L2VPN") service, such as an EVPN. PE devices 10 may exchange routing information via intermediate network 12 and process the routing information, selecting paths through its representation of the topology of the intermediate network 12 to reach all available destinations to generate forwarding information. In other words, PE devices 10 reduce these paths to so-called "next hops" which identify which of its interfaces traffic destined for a particular destination is to be forwarded. Each of PE devices 10 then installs this forwarding information in a forwarding plane of the respective one of PE devices 10, whereupon the forwarding plane forwards received traffic in accordance with the forwarding information.

Although additional network devices are not shown for ease of explanation, it should be understood that network system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

An EVPN may operate over a Multi-Protocol Label Switching (MPLS)-configured network (e.g., network 12) and use MPLS labels to forward network traffic accordingly. MPLS is a mechanism used to engineer traffic patterns within IP networks according to the routing information maintained by the network devices in the networks. By utilizing MPLS protocols, such as Label Distribution Protocol (LDP) or Resource Reservation Protocol with Traffic Engineering extensions (RSVP-TE), a source device can request a path (e.g., Label Switched Path (LSP)) through a network, e.g., network 12, to a destination device. An LSP defines a distinct path through the network to carry MPLS packets from the source device to a destination device. Using an MPLS protocol, each router along an LSP allocates a label and propagates the label to the closest upstream router along the path. Routers along the path add or remove the labels and perform other MPLS operations to forward the MPLS packets along the established path. Additional information with respect to the EVPN protocol is described in "BGP MPLS-Based Ethernet VPN," RFC 7432, Internet Engineering Task Force (IETF), February 2015, the entire contents of which is incorporated herein by reference.

To configure an EVPN, a network operator of network 12 configures, via configuration or management interfaces, various devices, e.g., PE devices 10, included within network 12 that interface with L2 customer networks 6. The EVPN configuration may include an EVPN instance ("EVI") 3, which comprises of one or more broadcast domains. EVPN instance 3 is configured within intermediate network 12 for customer networks 6 to enable endpoints 4 within customer networks 6 to communicate with one another via the EVI as if endpoints 4 were directly connected via an L2 network. Generally, EVI 3 may be associated with a virtual routing and forwarding instance ("VRF") (not shown) on a PE device, such as any of PE devices 10A-10C. Consequently, multiple EVIs may be configured on PE devices 10A-10C for an Ethernet segment, e.g., Ethernet segment 14, each of the EVIs providing a separate, logical L2 forwarding domain. As used herein, an EVI is an EVPN routing and forwarding instance spanning PE devices 10A-10C participating in the EVPN. In the example of FIG. 1, each of PE devices 10 is configured with EVI 3 and exchanges EVPN routes to implement EVI 3.

In some examples, Ethernet Tags are used to identify a particular broadcast domain, e.g., a VLAN/VNI, in an EVI. A PE device may advertise a unique EVPN label per <Ethernet Segment Identifier (ESI), Ethernet Tag> combination. This label assignment methodology is referred to as a per <ESI, Ethernet Tag> label assignment. Alternatively, a PE device may advertise a unique EVPN label per media access control (MAC) address. In still another example, a PE device may advertise the same single EVPN label for all MAC addresses in a given EVI. This label assignment methodology is referred to as a per EVI label assignment.

In an EVPN configuration, a CE device is said to be multi-homed when it is coupled to two or more physically different PE devices on the same EVI when the PE devices are resident on the same physical Ethernet segment. For example, CE device 8A is coupled to PE devices 10A-10B via links 16A-16B, respectively, where PE devices 10A-10B are capable of providing L2 customer network 6A access to the EVPN via CE device 8A. Multi-homed devices are often employed by network operators so as to improve access to EVPN provided by network 12 should a failure in one of egress PE devices 10A-10B or one of links 16A-16B occur. When a CE device is multi-homed to two or more PE devices, either one or all of the multi-homed PE devices are used to reach the customer site depending on the multi-homing mode of operation. In a typical EVPN configuration, PE devices 10A-10B participate in a designated forwarder (DF) election for each Ethernet segment identifier (ESI), such as the ESI for Ethernet segment 14. The PE device that assumes the primary role for forwarding BUM traffic to the CE device is called the designated forwarder ("DF"). The other PE device is either a non-designated forwarder ("non-DF") or a backup designated forwarder ("BDF" or "backup DF"). In the event of a failure to the DF, the other PE device becomes the DF following a global repair process in which the current DF is withdrawn and a new DF election is performed.

For each EVI that is coupled to an Ethernet segment, the EVPN protocol directs the router to output a routing protocol message advertising an Ethernet Auto-Discovery (AD) route (Type 1) specifying the relevant ESI for the Ethernet segment coupled to the EVPN instance. For example, PE devices 10A and 10B may each advertise an Ethernet Auto-Discovery (AD) per Ethernet Segment (Ethernet AD per ES) route to advertise reachability of the PE device for the Ethernet segment. To enable PE devices configured with EVI 3 to discover one another, each of PE devices 10 advertises an Ethernet AD per EVI route. An Ethernet AD route may include an RD (which may include, e.g., an IP address of the originating PE device), ESI, Ethernet Tag Identifier, and/or MPLS label. For purposes of DF election per Ethernet segment, each of PE devices 10 advertises an Ethernet segment route (Type 4), which is typically unique across all EVPN instances (EVIs), for each of the Ethernet segments multi-homed by the PE. For example, an Ethernet segment route may include a Route Distinguisher (RD), ESI, and an originating network device's network address (e.g., IP address).

Each of the routes are advertised by multi-homed PE devices and imported by PE devices that share the same EVI on the advertising ESI. In the example of FIG. 1, each of PE devices 10A-10B of EVI 3 advertise the routes described above and are imported by all PE devices of EVI 3 on the advertising ESI to discover each other and to elect a designated forwarder for Ethernet segment 14.

Once the EVPN is operational for the {EVI, ESI} pair, PE devices 10A-10B output routing protocol messages to remote PE device 10C to announce media access control (MAC) addresses associated with customer equipment in customer network 6A. For example, PE devices 10 output BGP MAC routes including an RD, ESI, Ethernet Tag Identifier, MAC address and MAC address length, network address and network address length, and MPLS label, for example. Additional information with respect to the EVPN protocol is described in "BGP MPLS-Based Ethernet VPN," Internet Engineering Task Force (IETF), RFC 7432, February 2015, the entire content of which is incorporated herein by reference.

In the example of FIG. 1, intermediate network 12 may implement a tunneling protocol to establish one or more tunnels to tunnel traffic between L2 customer networks 6 over the L3 intermediate network 12. In one example, PE devices 10 may implement VXLAN that provides a tunneling scheme to overlay L2 networks on top of L3 networks. VXLANs establish tunnels for communicating traffic, e.g., BUM packets, over common physical IP infrastructure between Network Virtualization Edges/VXLAN Tunneling Endpoints (VTEPs), e.g., PE devices 10. That is, VXLAN creates virtual L2 networks spanning physical L3 networks between VTEPs. For example, PEs 10 operating as VTEPs may encapsulate VXLAN traffic and de-encapsulate that traffic when it leaves the VXLAN tunnel. As one example, VTEPs communicate traffic with a 24-bit segment ID, Virtual Network Identifier (VNI), that uniquely identifies the VXLAN. For instance, the VNI maps to a tenant Virtual Local Area Network (VLAN) identifier, where the tenant VLAN identifier gets mapped to an EVPN instance (EVI). The VNI is included in an outer header that encapsulates an inner MAC frame such that MAC addresses may overlap across segments, but are isolated using the VNI. In a way, VXLAN "stretches" an L2 network over an intermediate L3 network. Additional examples of VXLAN are described in "Virtual eXtensible Local Area Network (VXLAN): A Framework for Overlaying Virtualized Layer 2 Networks over Layer 3 Networks," Request for Comments 7348, August 2014, the entire contents of which is incorporated by reference herein. PE devices 10 may implement other tunneling protocols, such as Network Virtualization using Generic Routing Encapsulation (NVGRE), Generic Routing Encapsulation (GRE), MPLS-over-GRE, User Datagram Protocol (UDP), or MPLS-over-UDP.

In the example of FIG. 1 where PE devices 10 provide VXLAN, PE devices 10 operate as tunneling endpoints (VTEPs) for a VXLAN tunnel to encapsulate VXLAN traffic and de-encapsulate VXLAN traffic when it leaves the VXLAN tunnel. For example, PE device 10A may receive L2 traffic from customer network 6A, and encapsulate the L2 traffic with a VXLAN header to tunnel the traffic across a VXLAN tunnel to a destination VTEP, e.g., PE device 10B. In this way, PE devices 10 provide an EVPN-VXLAN network overlay using a VLXAN underlay to transport L2 communications, such as Ethernet packets or "frames," for customer networks 6, in a transparent manner, i.e., as if the intermediate network 12 does not exist and customer networks 6 were instead directly connected.

Ordinarily, a PE device elected as DF is configured to implement split-horizon filtering, which prevents the PE device from forwarding traffic that it receives back to the source. For example, a non-DF PE device may receive a packet from a customer network and sends the packet over the intermediate network to the DF PE device. The DF PE device typically maintains a list of non-DF PE devices that are part of the ES based on the Ethernet AD routes received. The DF PE device is then configured to drop traffic received from intermediate network 12 if, for example, a source IP address (remote VTEP IP address) in a VXLAN packet corresponds to one of the PE devices in the list of non-DF PE devices.

In some examples, a link between the CE device and the non-DF PE device may go down. When the link is back up, the non-DF PE device sends an Ethernet AD route to DF PE device to advertise reachability on the Ethernet segment. The DF PE device stores the non-DF PE device in the list of non-DF PE devices used to implement split-horizon filtering. However, in some instances, the non-DF PE device may send traffic over intermediate network to the DF PE device before the non-DF PE device sends an Ethernet AD route advertising its reachability on the Ethernet segment. Without the techniques described in this disclosure, the DF PE device sends the traffic back to the Ethernet segment because the list of non-DF PE devices in DF PE device does not include the non-DF PE device. This creates a transient BUM loop in which the traffic flows from the CE device to the non-PE device, from the non-PE device to the DF PE device, and from the DF PE device back to the CE device.

In accordance with the techniques described herein, a PE device of an Ethernet segment, e.g., DF PE device 10B of Ethernet segment 14, may advertise split-horizon identifier such that other devices of the Ethernet segment, e.g., non-DF PE device 10A, may encapsulate the split-horizon identifier in a BUM packet to cause DF PE device 10B, upon receipt of the BUM packet over intermediate network 12, to perform split-horizon filtering on the packet without needing to search for a match in a list of non-DF PE devices.

In this example, PE device 10B is configured to apply split-horizon filtering if PE device 10B receives a BUM packet over intermediate network 12 and includes a split-horizon identifier, e.g., split horizon identifier 24, that was advertised by PE device 10B to other PE devices of Ethernet segment 14, e.g., PE device 10A. For example, PE device 10B advertises an Ethernet AD per Ethernet segment route encapsulated with split-horizon identifier 24 to other PE devices of Ethernet segment 14. As one example, PE device 10B may advertise Ethernet AD route 20 for Ethernet segment 14 including a split-horizon identifier 24 within a tagging packet frame, such as a tagging packet frame in accordance with the 802.1Q tag format. As one example, an 802.1Q packet may comprise a custom Tag Protocol Identifier (TPID) that identifies the packet as an IEEE 802.1 Q-tagged frame. As one example, the 802.1Q packet may comprise 32 bits with 16 bits for a custom TPID reserved for split horizon filtering. The remaining 16 bits of the 802.1Q packet may be used to denote a split-horizon identifier. In the example of FIG. 1, PE device 10B is configured to check for the custom TPID in a BUM packet received over intermediate network 12, and is configured to not forward the packet to Ethernet segment 14 if the BUM packet includes the split-horizon identifier advertised by PE device 10B.

PE device 10A, in this example, receives the Ethernet AD route 20 from PE device 10B and is configured to encapsulate a packet received from the customer network with the split horizon identifier 24 extracted from Ethernet AD route 20. As one example, non-DF PE device 10A, in this example, may receive a packet 22 from CE device 8A that is originated by endpoint 4A and destined for endpoint 4B. In response, non-DF PE device 10A encapsulates split-horizon identifier 24 within packet 22, such as inserting split-horizon identifier 24 within a header of the packet prior to the payload of the packet. For example, non-PE device 10A may encapsulate the split-horizon identifier 24 as part of a TPID within or appended to a tunneling header added to packet 22 by non-DF PE device 10 when forwarding packet 22 into EVPN instance 3. In this way, packet 22 having split-horizon identifier 24 is collectively shown as encapsulated packet 26 in FIG. 1. For example, PE device 10A may encapsulate packet 22 with an outer tunnel transport header (not shown in FIG. 1) to tunnel packet 22 including the split-horizon identifier 24 over a tunnel to PE device 10B as encapsulated packet 26. In the example of FIG. 1 in which PE devices 10 implement VXLAN, the outer tunnel transport header may include, for example, a source MAC address of the source VTEP, e.g., PE device 10A, a destination MAC address of a next router along the path toward the destination VTEP, e.g., PE device 10B, a source IP address of the source VTEP, a destination IP address of the destination VTEP, and a VNI that indicates the VXLAN overlay network. The outer tunnel transport header also includes a header identifying a tunneling scheme. For example, in the case of a VXLAN tunnel, the tunnel scheme header may include a User Datagram Protocol (UDP) header including a source UDP port and destination UDP port. The tunnel scheme header may differ based on the tunneling scheme implemented.

PE device 10A sends the encapsulated packet 26 across the tunnel to a destination tunnel endpoint, e.g., PE device 10B. When PE device 10B receives the encapsulated packet 26, PE device 10B may de-encapsulate the outer tunnel transport header and check the packet for the split-horizon identifier 24. PE device 10B may determine the split-horizon identifier 24 is included as part of the tag containing TPID and does not forward packet 22 back to Ethernet segment 14 that is identified by the split-horizon identifier 24.

That is, non-DF PE device 10A may encapsulate a split-horizon identifier determined from Ethernet AD route 20 received from DF PE device 10B, and send the encapsulated packet across intermediate network 12 such that DF PE device 10B applies split-horizon filtering without needing to perform a lookup of a list of non-DF PE devices that may not include non-DF PE device 10A in some instances.

Although the techniques described herein are described with respect to a DF PE device performing split horizon filtering, the techniques may also apply to any PE device of the Ethernet segment, such as non-DF PE device 10A in the example of FIG. 1. For example, the split horizon filtering techniques may be applied to a non-DF when DF election status is not ready on the PE devices coupled to an Ethernet segment.

In this way, if the PE device operates as a DF (or non-DF when DF election status is not ready on the PE devices coupled to an ES), the PE device may apply split-horizon filtering without needing to perform a match of a list of non-DF PE devices.

Figure 2:
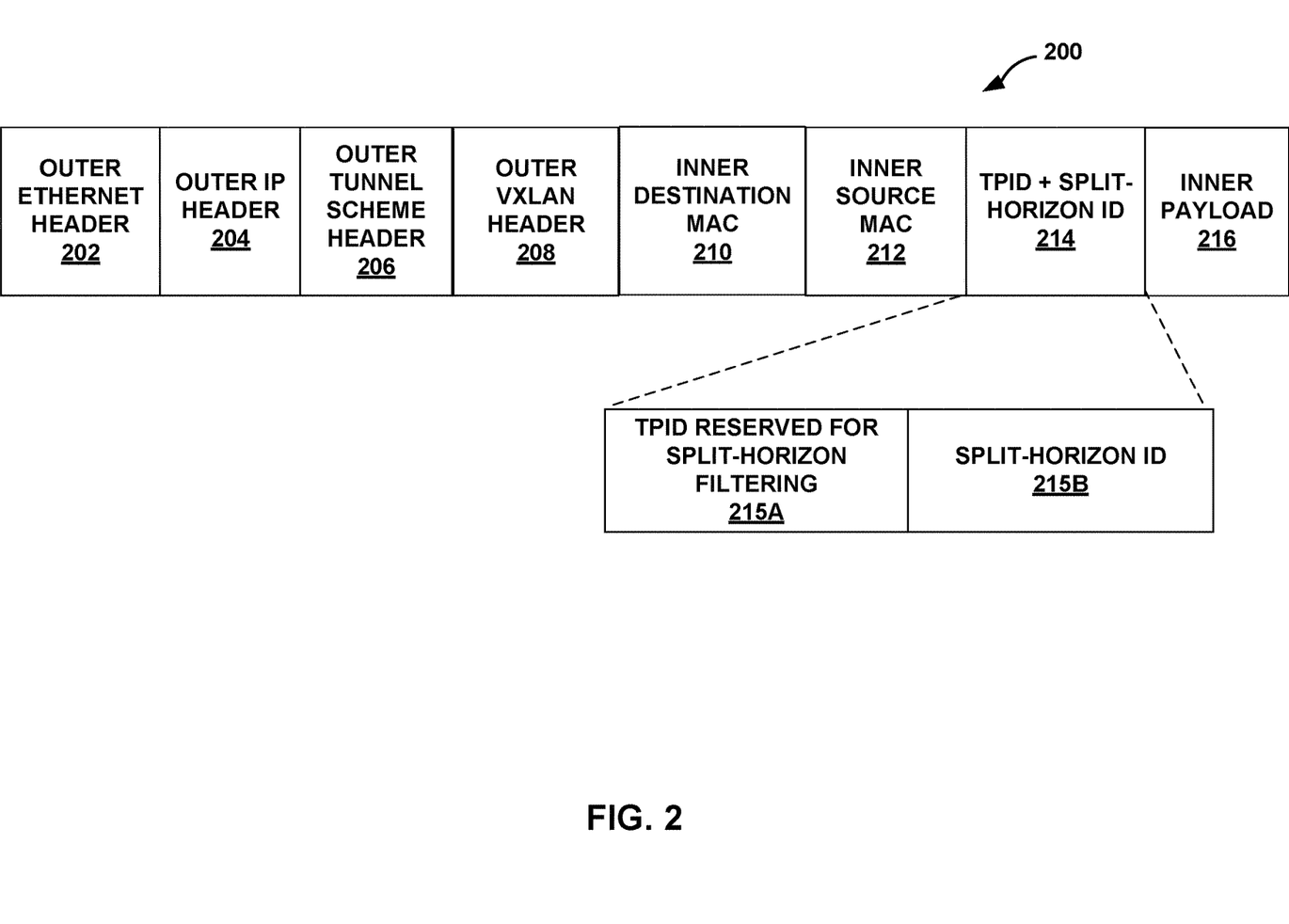
FIG. 2 is a block diagram illustrating an example packet encapsulated with a split-horizon identifier, in accordance with the techniques described herein.

FIG. 2 is a block diagram illustrating an example packet encapsulated with a split-horizon identifier, in accordance with the techniques described herein. Packet 200 of FIG. 2 may represent one example format of encapsulated packet 26 of FIG. 1. In the example of FIG. 2, packet 200 includes an outer Ethernet header 202, outer IP header 204, outer VXLAN tunneling scheme header (e.g., UDP or GRE) 206, outer VXLAN header 208, inner destination MAC address 210, inner source MAC address 212, TPID and split-horizon identifier 214, and inner payload 216. In this example, split-horizon identifier 214 has been inserted between payload 216 and the header fields used to forward and/or route packet 200.

Outer Ethernet header 202 may include a source MAC address of the source tunneling endpoint (e.g., PE device 10A of FIG. 1), a destination MAC address of a router along the path to the destination tunneling endpoint (e.g., PE device 10B of FIG. 1). Outer IP header 204 may include a source IP address of the source tunneling endpoint (e.g., PE device 10A), a destination IP address of the destination tunneling endpoint (e.g., PE device 10B).

Outer tunnel scheme header 206 may include tunneling information based on the tunneling scheme implemented. In examples where a VXLAN tunneling scheme is implemented, outer tunnel scheme header 206 may include a UDP header including a source UDP port, destination UDP port, UDP length, and UDP checksum, as further described in "Virtual eXtensible Local Area Network (VXLAN): A Framework for Overlaying Virtualized Layer 2 Networks over Layer 3 Networks," Request for Comments 7348, August 2014, the entire contents of which is incorporated by reference herein. In other examples where a GRE tunneling scheme is implemented, outer tunnel scheme header 206 may include a GRE header including a protocol type of the payload, a checksum, and reserved fields, as further described in "Generic Routing Encapsulation (GRE)," Network Working Group, Request for Comments RFC 2784, March 2000, and "Key and Sequence Number Extensions to GRE," Network Working Group, Request for Comments RFC 2890, September 2000, the entire contents of each of which is incorporated by reference herein. Outer VXLAN header 208 may include a VNI that indicates the VXLAN overlay network. The VNI is a 24-bit segment ID that uniquely identifies the VXLAN.

Inner destination MAC address 210 may include the MAC address of the destination host device (e.g., endpoint 4B of FIG. 1). Inner source MAC address 212 may include the MAC address of the source host device (e.g., endpoint 4A of FIG. 1). Inner payload 216 may include the original L2 packet received from the customer network.

In accordance with the techniques described herein, a non-DF PE device (e.g., PE device 10A of FIG. 1) may encapsulate a split-horizon identifier with a TPID (collectively illustrated as "TPID+SPLIT HORIZON ID 214") to an L2 packet received from the customer network, e.g., inner payload 216. In some examples, the TPID+SPLIT HORIZON-ID 214 is configured in accordance with the 802.1Q tag format. As one example, 802.1Q packet may comprise 32 bits with 16 bits reserved for the TPID ("Reserved TPID 215A"). The reserved TPID 215A may be 16 bits set to a value to identify the frame as an IEEE 802.1 Q-tagged frame. The remaining 16 bits of the 802.1Q packet is used to denote the split-horizon identifier 215B ("Split Horizon ID 215B"). As one example implementation, split-horizon ID 215B may be derived from the Ethernet AD route received from the egress PE device (e.g., Ethernet AD route 20B from PE device 10B of FIG. 1). The format structure of packet 200 illustrated in FIG. 2 is merely an example. For example, the split horizon ID 215B may comprise any number of bits of an 802.1Q packet. In other examples, the TPID+split-horizon ID 214 is encapsulated with any packet format for any type of tunnel. In other examples, the TPID+split-horizon ID 214 may be a label in a label stack used to tunnel a packet over an intermediate network (e.g., intermediate network 12 of FIG. 1) that implements MPLS.

Figure 3:
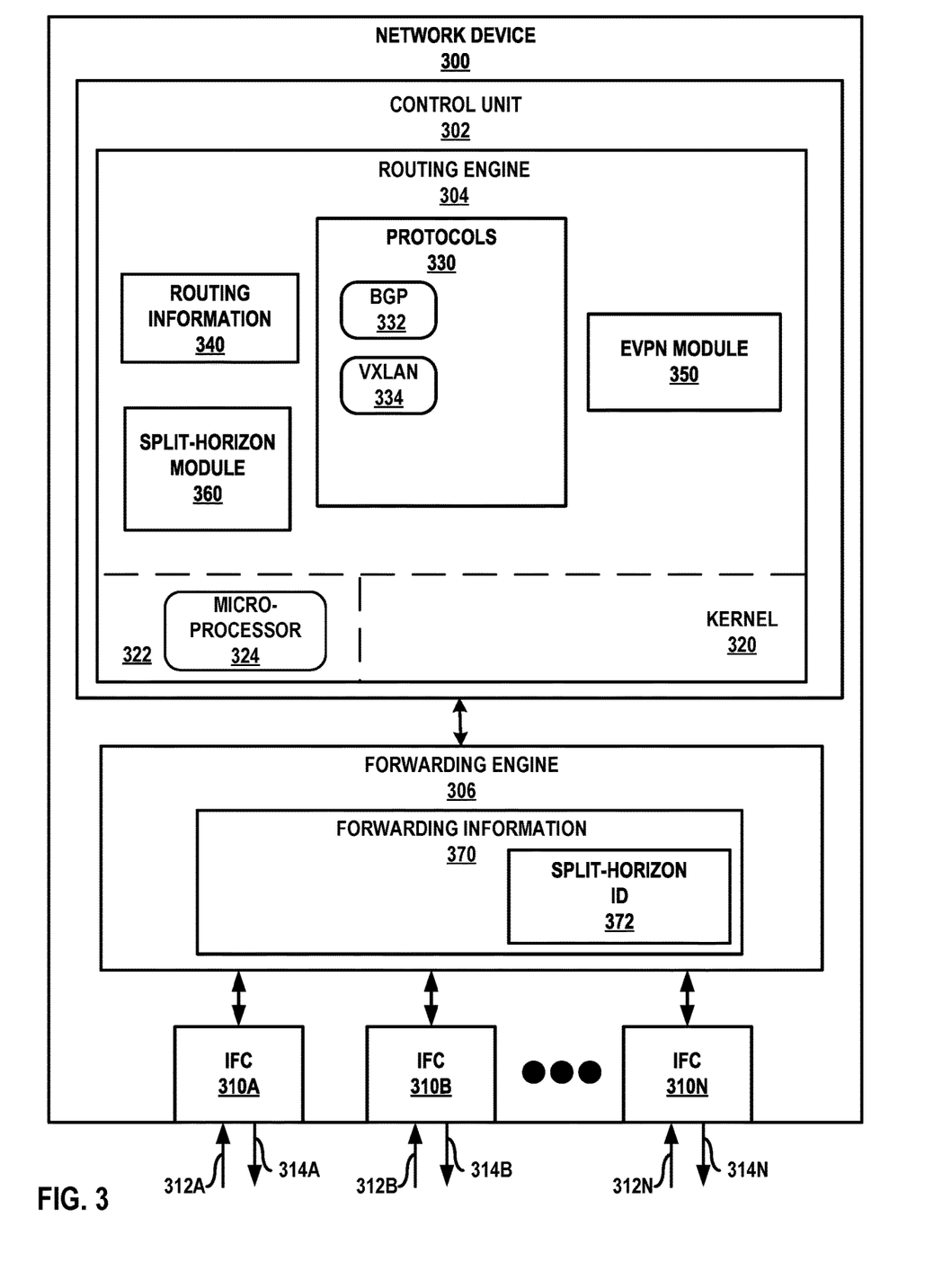
FIG. 3 is a block diagram illustrating an example network device configured to implement one or more techniques described herein.

FIG. 3 is a block diagram illustrating an example network device that is configured to implement one or more techniques described herein. Network device 300 may represent an example of any of PE devices 10 of FIG. 1. Network device 300 is described with respect to PE devices 10A and 10B of FIG. 1 but may be performed by any network device of an Ethernet segment. Network device 300 includes a control unit 302 having a routing engine 304, and control unit 302 is coupled to forwarding engine 306. Forwarding engine 306 is associated with one or more interface cards 310A-310N ("IFCs 310") that receive packets via inbound links 312A-312N ("inbound links 312") and send packets via outbound links 314A-314N ("outbound links 314"). IFCs 310 are typically coupled to links 312, 314 via a number of interface ports (not shown). Inbound links 312 and outbound links 314 may represent physical interfaces, logical interfaces, or some combination thereof.

Elements of control unit 302 and forwarding engine 306 may be implemented solely in software, or hardware, or may be implemented as combinations of software, hardware, or firmware. For example, control unit 302 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 302 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of network device 300, e.g., protocols, processes, and modules. Control unit 302, in some examples, retrieves and executes the instructions from memory for these aspects.

Routing engine 304 includes kernel 320, which provides a run-time operating environment for user-level processes. Kernel 320 may represent, for example, a UNIX operating system derivative such as Linux or Berkeley Software Distribution (BSD). Kernel 320 offers libraries and drivers by which user-level processes may interact with the underlying system. Hardware environment 322 of routing engine 304 includes microprocessor 324 that executes program instructions loaded into a main memory (not shown in FIG. 3) from a storage device (also not shown in FIG. 3) in order to execute the software stack, including both kernel 320 and processes executing on the operating environment provided by kernel 320. Microprocessor 324 may represent one or more general or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 320 provides an operating environment that executes various protocols 330 at different layers of a network stack, including protocols for implementing an EVPN network. For example, routing engine 304 includes network protocols that operate at a network layer of the network stack. In the example of FIG. 3, protocols 330 may include routing protocols, such as Border Gateway Protocol (BGP) 332, or other routing protocols not shown in FIG. 3, such as Open Shortest Path First (OSPF), Multiprotocol BGP (MP-BGP). Protocols 330 may also include tunneling protocols, such as Virtual Extensible LAN (VXLAN) 334, or other tunneling protocols not shown in FIG. 3, such as NVGRE, GRE, UDP and/or MPLS tunneling protocols. Routing engine 304 is responsible for the maintenance of routing information 340 to reflect the current topology of a network and other network entities to which network device 300 is connected. In particular, routing protocols periodically update routing information 340 to reflect the current topology of the network and other entities based on routing protocol messages received by network device 300.

Forwarding engine 306 represents hardware and logic functions that provide high-speed forwarding of network traffic. Forwarding engine 306 typically includes a set of one or more forwarding chips programmed with forwarding information that maps network destinations with specific next hops and the corresponding output interface ports. In general, when network device 300 receives a packet via one of inbound links 312, forwarding engine 306 identifies an associated next hop for the data packet by traversing the programmed forwarding information based on information within the packet. Forwarding engine 306 forwards the packet on one of outbound links 314 mapped to the corresponding next hop, such as a tunneling endpoint or a network device in a local customer network.

In the example of FIG. 3, forwarding engine 306 includes forwarding information 370. In accordance with routing information 340, forwarding engine 306 stores forwarding information 370 that maps packet field values to network destinations with specific next hops and corresponding outbound interface ports. For example, routing engine 304 analyzes routing information 340 and generates forwarding information 370 in accordance with routing information 340. Forwarding information 370 may be maintained in the form of one or more tables, link lists, radix trees, databases, flat files, or any other data structures.

Forwarding engine 306 stores forwarding information 370 for each peer tunneling endpoint to associate network destinations with specific next hops and the corresponding interface ports. Forwarding engine 370 forwards the data packet on one of outbound links 314 to the corresponding next hop (e.g., peer tunneling endpoint) in accordance with forwarding information 370. At this time, forwarding engine 370 may encapsulate and/or de-encapsulate packet headers (or push and/or pop labels in the case of MPLS) from the packet to forward the packet to the next hop. For example, if network device 300 is to send a packet to a peer tunneling endpoint over the intermediate network, forwarding engine 370 may encapsulate an outer tunnel transport header, e.g., outer Ethernet header 202, outer IP header 204, outer tunnel scheme header 206, outer VXLAN header 208, inner destination MAC address 210, and inner source MAC address 212, of packet 200 described in the example of FIG. 2. If network device 300 receives an encapsulated packet, forwarding engine 370 may de-encapsulate the outer tunnel transport header and send the inner payload 216 to the destination in accordance with forwarding information 370.

Routing engine 304 also includes an EVPN module 350 that performs L2 learning using BGP 332. EVPN module 350 may maintain MAC tables for each EVPN instance established by network device 300, or in alternative examples may maintain one or more MAC tables that are independent of each respective EVPN instance. The MAC tables, for instance, may represent a virtual routing and forwarding table of VRFs for an EVI configured for the VRF. EVPN module 350 may perform local L2/L3 (e.g., MAC/IP) binding learning by, e.g., using MAC information received by network device 300.

In accordance with the techniques described herein, network device 300 is configured to encapsulate a split-horizon identifier within a packet received from a customer network, and send the encapsulated packet to a DF PE device, and/or to apply split-horizon filtering if a packet received from the intermediate network includes the split-horizon identifier.

As one example, network device 300 may use BGP 332 to advertise and receive Ethernet AD routes per Ethernet segment with other PE devices to advertise reachability of the network devices for an Ethernet segment. In some examples, split-horizon module 360 of network device 300 advertises an Ethernet AD route including a split-horizon identifier. As described above, network device 300 may advertise the Ethernet AD route including the split-horizon identifier within a tagging packet frame, such as a tagging packet frame in accordance with the 802.1Q tag format. As one example, an 802.1Q packet may comprise a custom TPID that identifies the packet as an IEEE 802.1 Q-tagged frame.

In some examples in which network device 300 is an egress PE device (e.g., PE device 10B of FIG. 1), an administrator may use a configuration interface (not shown in FIG. 3) to configure forwarding engine 306 to determine whether an incoming BUM packet received from the intermediate network includes the split-horizon identifier. For example, routing engine 304 installs the split-horizon identifier that was advertised by network device 300 within forwarding engine 306 (illustrated as "split-horizon identifier 372") and configures forwarding engine 306 to check whether a packet received from the intermediate network includes a TPID and split-horizon identifier 372, and if so, to not forward the packet to the Ethernet segment identified by the split-horizon identifier 372. In this way, network device 300 may perform split-horizon filtering without needing to search for a match in a list of non-DF PE devices.

In some examples in which network device 300 is an ingress PE device (e.g., PE device 10A of FIG. 1), an administrator may configure forwarding engine 306 to encapsulate the split-horizon identifier, extracted from an Ethernet AD route from an egress PE device of the Ethernet segment, within a BUM packet received from a customer network. For example, network device 300 may receive an Ethernet AD route via one of inbound links 312 from an egress PE device advertising reachability to an Ethernet segment coupled to network device 300 and the egress PE device. Split-horizon module 360 extracts the split-horizon identifier from the Ethernet AD route received from the egress PE device. Routing engine 304 installs the split-horizon identifier within forwarding engine 306 (illustrated as "split-horizon identifier 372") such that forwarding engine 306 may dynamically encapsulate an L2 BUM packet received from a customer network with the split-horizon identifier 372 along with other tunneling and forwarding header information, in accordance with the techniques described herein. Forwarding engine 306 may in some examples encapsulate the split-horizon identifier 372 by inserting the identifier within a packet as a custom TPID reserved for split-horizon filtering in accordance with the 802.1Q tag format. For example, forwarding engine 306 may, in response to receiving a BUM packet from an interface to the Ethernet segment, adds a 32-bit tag (16-bit TPID and 16-bit split-horizon identifier) to the packet and encapsulates the tagged frame as a payload of an outer VXLAN packet and sends the encapsulated packet to the outgoing interface to the intermediate network. In this way, network device 300 may encapsulate a packet received from a customer network with the split-horizon identifier 372 such that the egress PE device receives the BUM packet including the split-horizon identifier 372 advertised by the egress PE device, which may perform split-horizon filtering to the BUM packet without needing to search for a match in a list of non-DF PE devices.

Figure 4A:
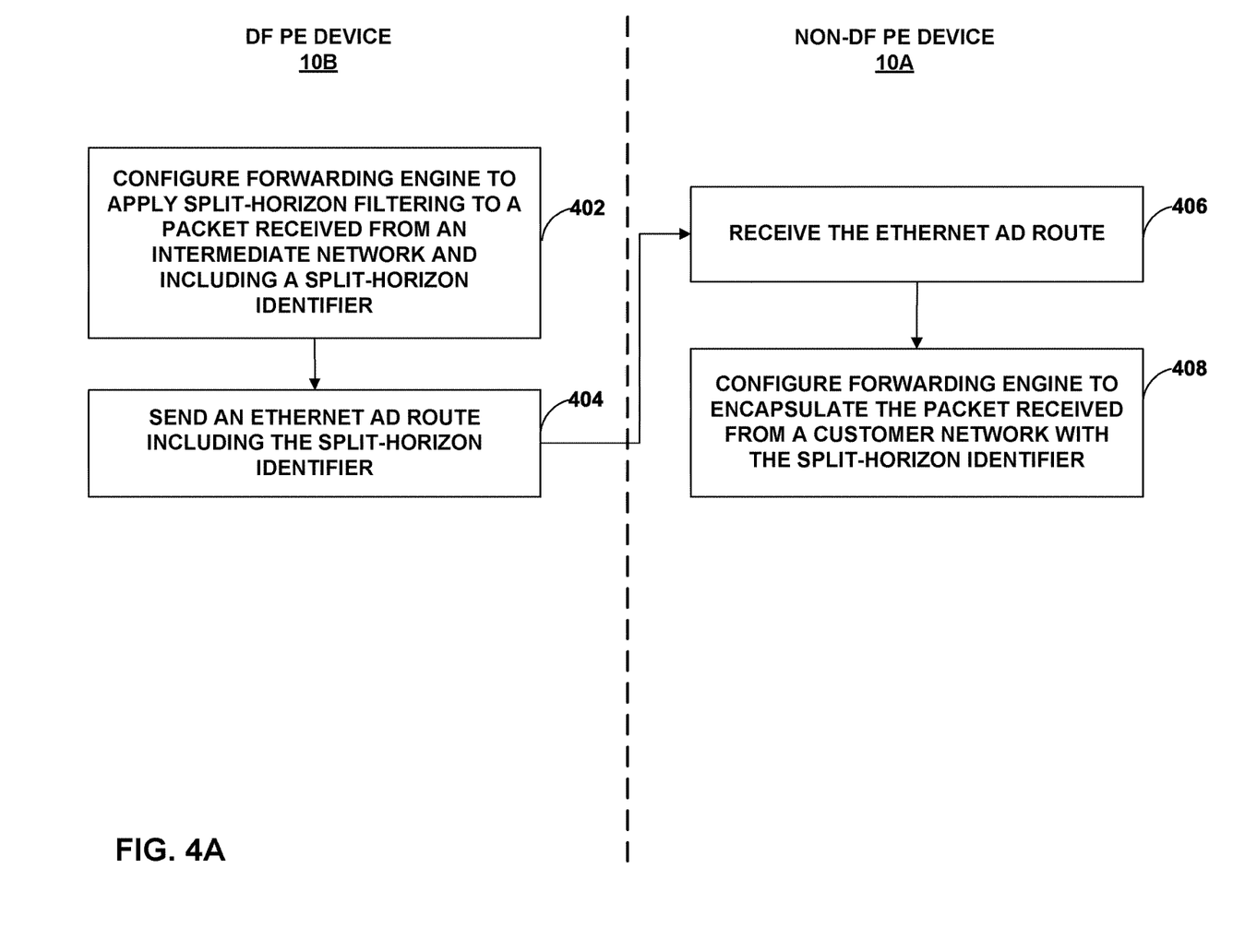
FIGS. 4A-4B are flowcharts illustrating an example operation of configuring and performing split-horizon filtering, respectively, in accordance with the techniques described herein.
Figure 4B:
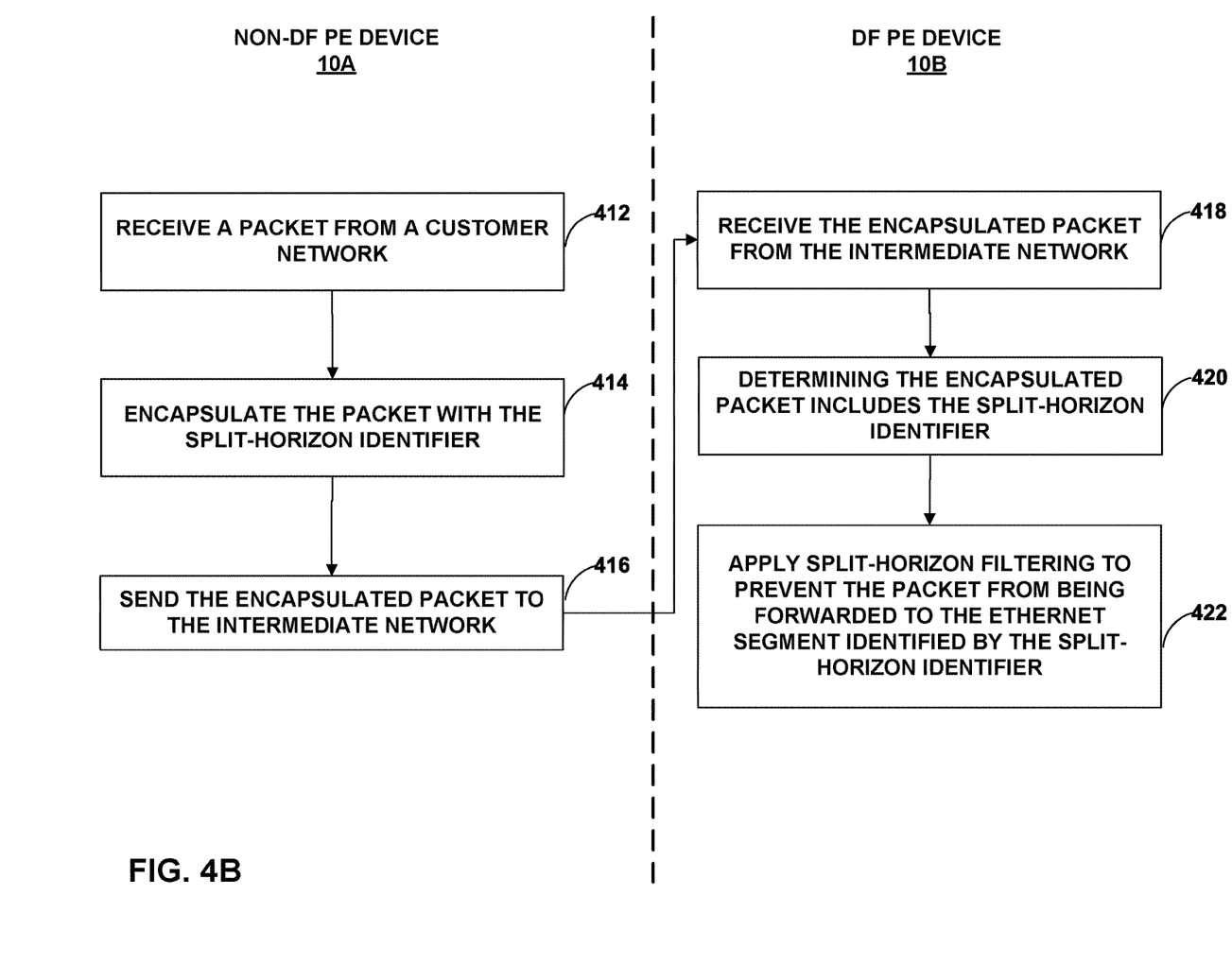

FIGS. 4A-4B are flowcharts illustrating an example operation of configuring and performing split-horizon filtering, respectively, in accordance with the techniques described herein.

FIG. 4A is a flowchart illustrating an example operation by any of PE devices 10A and 10B of FIG. 1 and network device 300 to configure split-horizon filtering. In the example of FIG. 4A, PE device 10B configures its forwarding engine to apply split-horizon filtering to a packet received from intermediate network 12 and including a split-horizon identifier advertised by PE device 10B (402). For example, PE device 10B includes a split-horizon module 360 that generates a split-horizon identifier that identifies the Ethernet segment connected to PE devices 10A and 10B. The routing engine of PE device 10B provides the split-horizon identifier to the forwarding engine of PE device 10B such that the forwarding engine of PE device 10B may drop a packet received from intermediate network 12 that includes the split-horizon identifier. In some examples, PE device 10B is configured to check for the custom TPID in a BUM packet received over intermediate network 12, and is configured to not forward the packet to Ethernet segment 14 if the BUM packet includes the split-horizon identifier advertised by PE device 10B.

PE device 10B of Ethernet segment 14 may advertise an Ethernet AD route to indicate its reachability for Ethernet segment 14. In this example, PE device 10B may send to other PE devices of Ethernet segment 14, e.g., PE device 10A, an Ethernet AD route including the split-horizon identifier (404). For example, PE device 10B may advertise Ethernet AD route 20 for Ethernet segment 14 including a split-horizon identifier 24 within a tagging packet frame, such as a tagging packet frame in accordance with the 802.1Q tag format. As one example, an 802.1Q packet may comprise a custom Tag Protocol Identifier (TPID) that identifies the packet as an IEEE 802.1 Q-tagged frame. As one example, the 802.1Q packet may comprise 32 bits with 16 bits for a custom TPID reserved for split horizon filtering. The remaining 16 bits of the 802.1Q packet may be used to denote a split-horizon identifier.

PE device 10A may receive the Ethernet AD route from PE device 10B including the split-horizon identifier (406), and in response to receiving the Ethernet AD route, PE device 10A configures its forwarding engine to encapsulate the split-horizon identifier within a packet received from a customer network (408). For example, PE device 10A includes a split-horizon module 360 that extracts the split-horizon identifier from the Ethernet AD route received from PE device 10A. The routing engine of the PE device provides the split-horizon identifier determined from the split-horizon module 360 to the forwarding engine of the PE device such that the forwarding engine of the PE device may encapsulate an L2 packet received from a customer network with the split-horizon identifier. In some examples, PE device 10A is configured to add a 32-bit tag (16-bit TPID and 16-bit split-horizon identifier) to the packet and encapsulates the tagged frame as a payload of an outer VXLAN packet and sends the encapsulated packet to intermediate network 12 toward the egress PE device, e.g., PE device 10B.

FIG. 4B is a flowchart illustrating an example operation of PE devices 10 providing split-horizon filtering. In the example of FIG. 4B, non-DF PE device 10A receives a packet from a customer network (412). For example, PE device 10A may receive an L2 packet via one of its inbound links from a local customer network, e.g., customer network 6A, such as a site of an enterprise network, or from tenants of a data center network. Non-DF PE device 10A encapsulates the packet with the split-horizon identifier received from DF PE device 10B that identifies an Ethernet segment coupled to the non-DF PE device (e.g., PE device 10A) and the DF PE device (e.g., PE device 10B) (414). As one example, the forwarding engine of non-DF PE device 10A may encapsulate a tag including the split-horizon identifier. For example, the forwarding engine of PE device 10A may add a 32-bit tag (16-bit TPID and 16-bit split-horizon identifier) to the packet and encapsulates the tagged frame as a payload of an outer VXLAN packet and sends the encapsulated packet to intermediate network 12 toward the egress PE device, e.g., PE device 10B.

Non-DF PE device 10A sends the encapsulated packet toward the other PE devices in the EVPN instance via intermediate network 12 (416). For example, the forwarding engine of PE device 10A may encapsulate an outer tunnel transport header that identifies the tunneling endpoints and send the encapsulated packet including the split-horizon identifier to a destination tunneling endpoint, e.g., PE device 10B.

In response to DF PE device 10B receiving the encapsulated packet (418), PE device 10B may de-encapsulate the outer tunnel transport header and determines that the packet includes the split-horizon identifier (420). In response, DF PE device 10B may apply split-horizon filtering to prevent the packet from being forwarded to the Ethernet segment identified by the split-horizon identifier (422).

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

What is claimed is:

1. A method comprising:
configuring, by a first provider edge (PE) device, to apply split-horizon filtering to prevent a packet received from an intermediate network and including a split-horizon identifier from being forwarded to an Ethernet segment coupled to the first PE device and one or more other PE devices, wherein the first PE device and the one or more other PE devices implement an Ethernet Virtual Private Network (EVPN);
sending, by the first PE device and to the one or more other PE devices coupled to the Ethernet segment, Ethernet Auto-Discovery (AD) routes advertising reachability to the Ethernet segment, wherein the Ethernet AD routes include the split-horizon identifier;
receiving, by the one or more other PE devices, the Ethernet AD routes including the split-horizon identifier; and
configuring, by the one or more other PE devices, the one or more other PE devices to encapsulate a packet received from a customer network with the split-horizon identifier.

2. The method of claim 1, further comprising:
receiving, by the first PE device, a packet from the intermediate network;
determining, by the first PE device, the packet includes the split-horizon identifier; and
in response to determining that the packet includes the split-horizon identifier, applying, by the first PE device, split-horizon filtering to prevent the packet from being forwarded to the Ethernet segment identified by the split-horizon identifier.

3. The method of claim 1, further comprising:
receiving, by the one or more other PE devices, the packet from the customer network;
encapsulating, by the one or more other PE devices, the split-horizon identifier within the packet; and
sending, by the one or more other PE devices, the encapsulated packet over the intermediate network to the first PE device.

4. The method of claim 3, wherein encapsulating the split-horizon identifier within the packet comprises:

encapsulating, by the first PE device, a tagging packet frame including the split-horizon identifier to the packet.

5. The method of claim 4, wherein the tagging packet frame is an Institute of Electrical and Electronics Engineer (IEEE) 802.1q packet including a Tag Protocol Identifier (TPID) that indicates the tagging packet frame as an 802.1q packet.

6. The method of claim 4, wherein the split-horizon identifier is a 16-bit identifier of the tagging packet frame.

7. A first provider edge (PE) device comprising:
one or more processors operably coupled to a memory, wherein the one or more processors are configured to:
configure the first PE device to apply split-horizon filtering to prevent a packet received from an intermediate network and including a split-horizon identifier from being forwarded to an Ethernet segment coupled to the first PE device and one or more other PE devices, wherein the first PE device and the one or more other PE devices implement an Ethernet Virtual Private Network (EVPN); and
send, to the one or more other PE devices coupled to the Ethernet segment, Ethernet Auto-Discovery (AD) routes advertising reachability to the Ethernet segment, wherein the Ethernet AD routes include the split-horizon identifier to cause the one or more other PE devices to be configured to encapsulate a packet received from a customer network with the split-horizon identifier.

8. The first PE device of claim 7, wherein the one or more processors are further configured to:
receive the packet from the intermediate network;
determine the packet includes the split-horizon identifier;
in response to determining the packet includes the split-horizon identifier, apply split-horizon filtering to prevent the packet from being forwarded to the Ethernet segment identified by the split-horizon identifier.

9. The first PE device of claim 7, wherein the split-horizon identifier comprises a first split-horizon identifier, wherein the one or more processors are further configured to:
receive, from a second PE device of the one or more other PE devices coupled to the Ethernet segment, an Ethernet AD route including a second split-horizon identifier; and
configuring, by the second PE device, the second PE device to encapsulate a packet received from a customer network with the second split-horizon identifier.

10. The first PE device of claim 9, wherein the one or more processors are further configured to:
receive the packet from the customer network;
encapsulate the second split-horizon identifier within the packet; and
send the encapsulated packet over the intermediate network to the second PE device.

11. The first PE device of claim 10, wherein, to encapsulate the second split-horizon identifier within the packet, the one or more processors are further configured to:
encapsulate a tagging packet frame including the second split-horizon identifier to the packet.

12. The first PE device of claim 11, wherein the tagging packet frame is an Institute of Electrical and Electronics Engineer (IEEE) 802.1q packet including a Tag Protocol Identifier (TPID) that indicates the tagging packet frame as an 802.1q packet.

13. The first PE device of claim 9, wherein the second split-horizon identifier is a 16-bit identifier of the tagging packet frame.

14. A system comprising:
a first provider edge (PE) device configured to operate as a designated forwarder for an Ethernet segment, wherein the first PE device belongs to a set of routers implementing an Ethernet Virtual Private Network (EVPN); and
a second PE device configured to operate as a non-designated forwarder for the Ethernet segment, wherein the second PE device belongs to the set of routers implementing the EVPN;
wherein the first PE device comprises one or more first processors operably coupled to a first memory, wherein the one or more first processors are configured to:
configuring the first PE device to apply split-horizon filtering to prevent a packet received from an intermediate network and including the split-horizon identifier from being forwarded to the Ethernet segment;
send, to the second PE device, an Ethernet Auto-Discovery (AD) route advertising reachability to the Ethernet segment, wherein the Ethernet AD route includes the split-horizon identifier;
wherein the second PE device comprises one or more second processors operably coupled to a second memory, wherein the one or more second processors are configured to:
receive, from the first PE device, the Ethernet AD route including the split-horizon identifier; and
configure the second PE device to encapsulate a packet received from a customer network with the split-horizon identifier.

15. The system of claim 14, wherein the one or more first processors of the first PE device are further configured to:
receive the packet from the intermediate network;
determine the packet includes the split-horizon identifier;
in response to determining the packet includes the split-horizon identifier, apply split-horizon filtering to prevent the packet from being forwarded to the Ethernet segment identified by the split-horizon identifier.

16. The system of claim 14, wherein the one or more second processors of the second PE device are further configured to:
receive the packet from the customer network;
encapsulate the split-horizon identifier within the packet; and
send the encapsulated packet over the intermediate network to the first PE device.

17. The system of claim 16, wherein, to encapsulate the split-horizon identifier within the packet, the one or more second processors of the second PE device are further configured to:
encapsulate a tagging packet frame including the split-horizon identifier to the packet.

18. The system of claim 17, wherein the split-horizon identifier is a 16-bit identifier of the tagging packet frame.

19. The system of claim 17, wherein the tagging packet frame is an Institute of Electrical and Electronics Engineer (IEEE) 802.1q packet including a Tag Protocol Identifier (TPID) that indicates the tagging packet frame as an 802.1q packet.

* * * * *